(12) United States Patent
Chen et al.

(10) Patent No.: US 9,316,782 B2
(45) Date of Patent: Apr. 19, 2016

(54) COVERLESS LINEAR LIGHT SOURCE LIGHT GUIDE WITH HOODED BRACKET

(71) Applicant: PIXON TECHNOLOGIES CORP., Taipei Hsien (TW)

(72) Inventors: Yen-Chieh Chen, Taipei Hsien (TW); Shih Che Chen, Taipei Hsien (TW); Chien Liang Liao, Taipei Hsien (TW)

(73) Assignee: Pixon Technologies Corp., Taipei Hsien (TW)

( * ) Notice: Subject to any disclaimer, the term of this patent is extended or adjusted under 35 U.S.C. 154(b) by 241 days.

(21) Appl. No.: 14/138,795

(22) Filed: Dec. 23, 2013

(65) Prior Publication Data
US 2015/0177452 A1    Jun. 25, 2015

(51) Int. Cl.
*F21V 8/00* (2006.01)
*H04N 1/028* (2006.01)

(52) U.S. Cl.
CPC .............. *G02B 6/0091* (2013.01); *G02B 6/001* (2013.01); *G02B 6/0038* (2013.01); *G02B 6/0055* (2013.01); *H04N 1/02835* (2013.01)

(58) Field of Classification Search
CPC .... G02B 6/002; G02B 6/0015; G02B 6/0045; G02B 6/0013; G02B 6/0081; G02B 6/0038; G02B 6/0051; G02B 6/0091; H04N 1/02835
See application file for complete search history.

(56) References Cited

U.S. PATENT DOCUMENTS

| 2005/0270794 A1* | 12/2005 | Okamoto | F21S 48/211 362/555 |
| 2009/0034285 A1* | 2/2009 | Lee | H04N 1/02815 362/555 |

* cited by examiner

*Primary Examiner* — Karabi Guharay
(74) *Attorney, Agent, or Firm* — Rosenberg, Klein & Lee

(57) ABSTRACT

A coverless linear light source light guide with hooded bracket for holding a light emitting diode (LED) module to the light guide is disclosed. The hooded bracket is disposed around the light receiving end of the light guide and comprises a hood top, a hood back, two hood sides, and two hood grasps disposed on the hood sides. The hood back comprises the light receiving end of the light guide where light enters the light guide. The hood grasp comprises grasping elements that mate with grasping elements of the LED module to securely hold the LED module to the light guide. The hooded bracket ensures that the distance between the LED module and the light guide and the angle of the LED module and the light guide is constant which maintains optimal alignment and proximity in order to conserve received light intensity and maintain uniformity of emitted light.

18 Claims, 22 Drawing Sheets

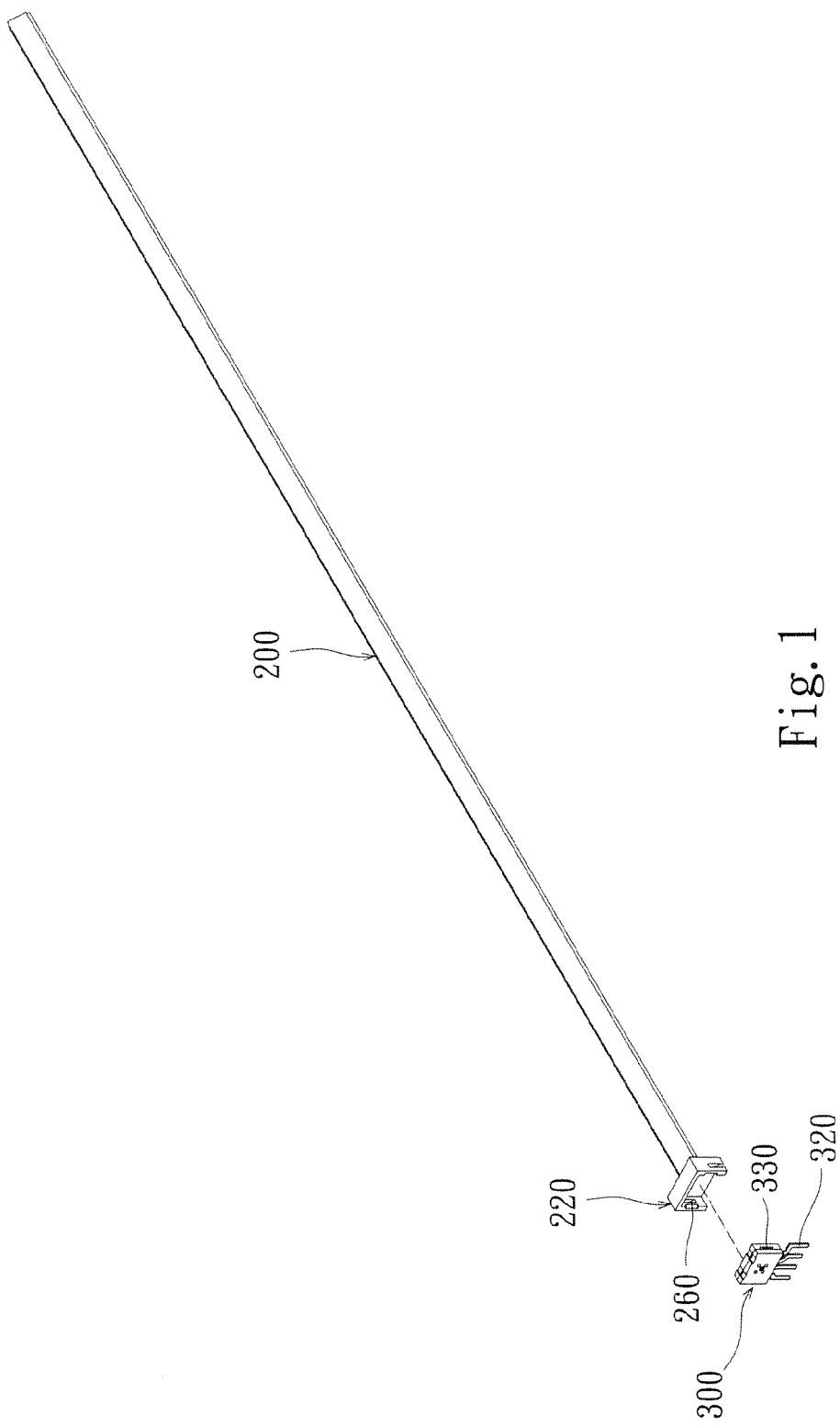

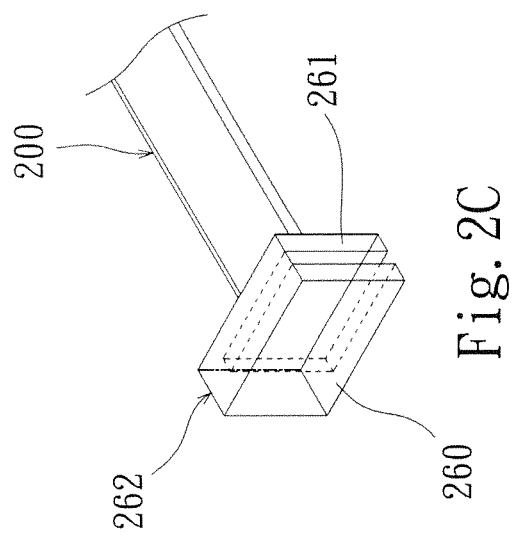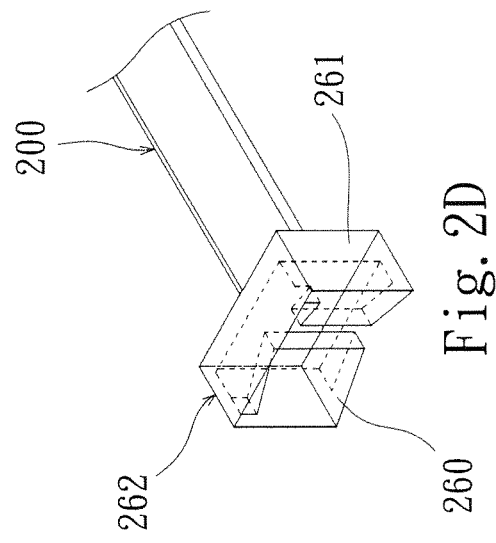

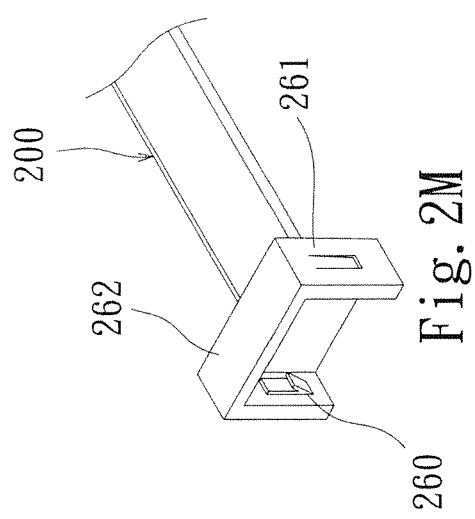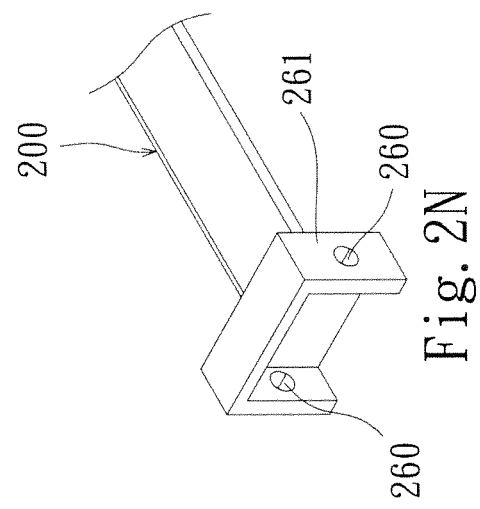

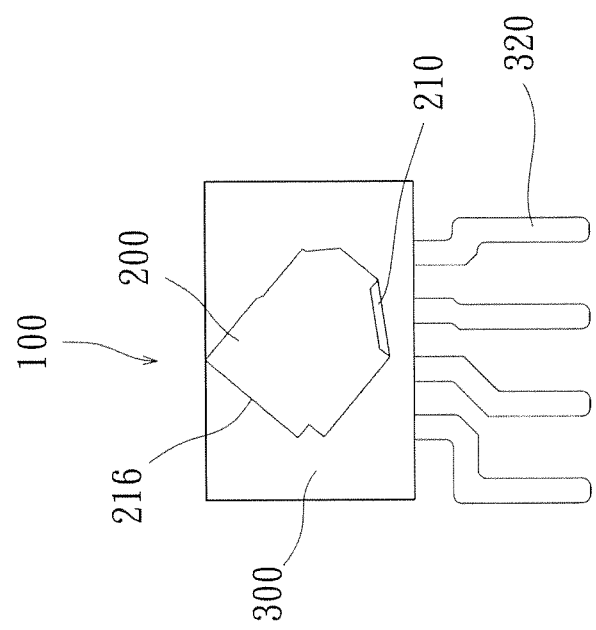

COVERLESS LINEAR LIGHT SOURCE LIGHT GUIDE WITH HOODED BRACKET

BACKGROUND OF THE INVENTION

1. Field of the Invention

The present invention relates to lighting devices. More specifically, the present invention discloses a linear light source light guide with a hooded bracket for securely attaching a light emitting diode module to the light guide to maintain optimal alignment and proximity in order to conserve received light intensity and maintain uniformity of emitted light of a coverless linear light source.

2. Description of the Prior Art

Linear light sources are used in scanners to light to illuminate an object. When the object is illuminated, the scanner is able to acquire an image of the object.

However, the performance of the linear light source greatly affects the quality of the acquired image. If the emitted light is not uniform or varies in intensity, the object will not be effectively lit and the acquired image will be of inferior quality with areas of the object too light and areas of the object too dark.

In the conventional scanner light source a light emitting diode shines light into a light bar that is positioned next to a light emitting diode. Since they are not connected, vibration from moving the device or from operating the scanner causes the light bar to change proximity to the light emitting diode. When the light bar moves away from the light emitting diode, the amount and intensity of light entering the light bar changes and decreases. As a result, the brightness and uniformity of emitted light is not constant and reliable.

Additionally, in the conventional light source the angle of the light emitting diode and the light bar can easily change or vary. Since the light emitting diode and the light bar are not consistently at the same angle the optimal uniformity and brightness of emitted light is not obtained and the conventional light source does not provide an emitted light of superior quality.

Therefore, there is need for an improved cost effective linear light source with superior light intensity and light uniformity that utilizes a light guide with a hooded bracket for holding a light emitting diode module to the light guide at a constant and optimal distance and angle.

SUMMARY OF THE INVENTION

To achieve these and other advantages and in order to overcome the disadvantages of the conventional method in accordance with the purpose of the invention as embodied and broadly described herein, the present invention provides a linear light source light guide with a hooded bracket for securely attaching a light emitting diode module to the light guide to maintain optimal alignment and proximity in order to conserve received light intensity and maintain uniformity of emitted light.

The hooded bracket is disposed around the light receiving end of the light guide and comprises a hood top, a hood back, two hood sides, and two hood grasps disposed on the hood sides.

The hood back comprises the light receiving end of the light guide where light enters the light guide.

The hood grasp comprises grasping elements, for example, a tab, an ear, a hole, a slot, a groove, an indentation, a post, or a slide rail which mate with grasping elements of a light emitting diode (LED) module to securely hold the LED module to the light guide.

Since the LED module is held to the light guide, the distance between the LED module and the light guide and the angle of the LED module and the light guide is constant. As a result, the hooded bracket for attaching the light emitting diode module to the light guide maintain optimal alignment and proximity in order to conserve received light intensity and maintain uniformity of emitted light of the coverless linear light source.

The present invention provides a coverless linear light source with improved light uniformity and light intensity without needing or using a reflective cover or housing around the light guide. Eliminating the reflective cover or housing reduces production costs including labor, material, tooling, inventory, and assembly costs as well as reducing manufacturing complexity thus saving time. This is an advantage of the present invention The light guide further comprises a light emitting surface where light exits the light guide and a light reflecting patterned surface for reflecting light towards the light emitting surface. The light reflecting patterned surface comprises a plurality of peaks and a plurality of valleys with a valley disposed between each peak.

As the light reflecting patterned surface extends along the light guide the depth of each valley increases. At the pattern start, which is closest to the LEDs, the depth of the valley is shallowest and the height of the peak from the floor of the valley is the shortest.

As the light reflecting patterned surface continues away from the LEDs the depth of the valley gradually increases and the height of the peak from the floor of the valley continues to gradually increase.

At the pattern end, which is farthermost away from the LEDs, the depth of the valley is deepest and the height of the peak from the floor of the valley is the tallest.

At the pattern end the floor of the valley is narrowest and the pattern is or approaches a sawtooth pattern where the valley is or approaches a v-shape. Moving towards the LEDs the floor of the valley becomes flat and gradually widens. At the pattern start 230 the floor of the valley is widest.

When power is applied conductive pins of the LED module, which are electrically connected to LEDs, the LEDs illuminate and emit light into the light receiving end of the light guide. The light travels or propagates through the light guide and is reflected by the light reflecting patterned surface towards the light emitting surface of the light guide and the light exits the light guide through the light emitting surface.

A plurality of side surfaces are disposed between the light emitting surface and the light reflecting patterned surface.

A side groove and a top groove are provided for allowing the light guide to be held to a main housing of the scanner sub-module. The main housing's side clips hold the side groove and top clips hold the top groove.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings:

FIG. 1 is an exploded view drawing illustrating a light guide with hooded bracket and a light emitting diode module of a coverless linear light source according to an embodiment of the present invention;

FIG. 2C is an end view drawing illustrating a hooded bracket of a light guide according to an embodiment of the present invention;

FIG. 2D is a cross-sectional drawing illustrating a light guide with a hooded bracket according to an embodiment of the present invention;

FIG. 2M is a drawing illustrating a hood grasp of a hooded bracket according to an embodiment of the present invention;

FIG. 2N is a drawing illustrating a hood grasp of a hooded bracket according to an embodiment of the present invention;

FIG. 4A is a drawing illustrating a coverless linear light source according to an embodiment of the present invention;

DESCRIPTION OF THE PREFERRED EMBODIMENTS

Figure 2A:
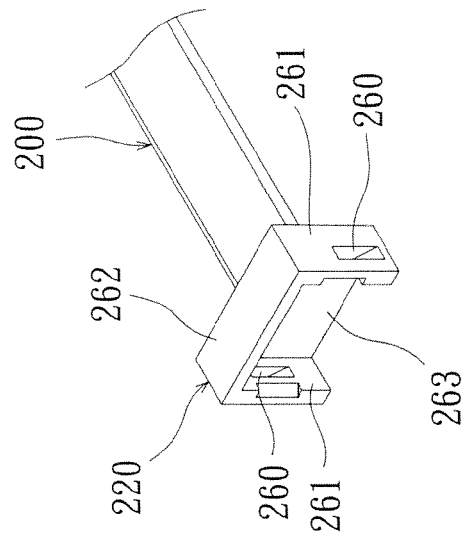
FIG. 2A is a drawing illustrating a light guide with a hooded bracket according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Refer to FIG. 1 is an exploded view drawing illustrating a light guide with hooded bracket and a light emitting diode module of a coverless linear light source according to an embodiment of the present invention.

The light emitting diode (LED) module 300 comprises a plurality of LEDs disposed in a module body. A plurality of conductive pins 320 extend below the module body for electrically connecting the plurality of LEDs 310 to conductive traces on a printed circuit board (PCB) in the main housing. The LED module 300 further comprises module grasps 330 disposed on sides of the module body.

The light guide 200 comprises an elongated polygonal transparent material. Light emitted by the LED module 300 enters an end of the light guide 200 and is reflected by a patterned surface of the light guide 200. The light eventually exits the light guide through a light emitting surface of the light guide 200.

The light guide 200 further comprises a hooded bracket 220 with hood grasps 260. The hooded bracket 220 is disposed on the light receiving end of the light guide 200.

The LED module 300 is inserted into the hooded bracket 220 and the hooded bracket 220 holds the LED module 300 and the light guide 200 together.

Refer to FIG. 2A, which is a drawing illustrating a light guide with a hooded bracket according to an embodiment of the present invention.

FIG. 2A shows a close up view of the light guide 200 and the hooded bracket 220. The hooded bracket 220 comprises a hood top 262, a hood back 263, two hood sides 261, and two hood grasps 260 disposed in the hood sides 261.

The hood back 263 comprises the light receiving end of the light guide 200 where light enters the light guide 200.

The hood grasp 260 comprises grasping elements, for example, a tab, an ear, a hole, a slot, a groove, an indentation, a post, or a slide rail which mate with grasping elements of a light emitting diode (LED) module.

Refer to FIGS. 2B-2N, which are drawings illustrating hooded brackets and hood grasps of light guides according to embodiments of the present invention.

Figure 2B:
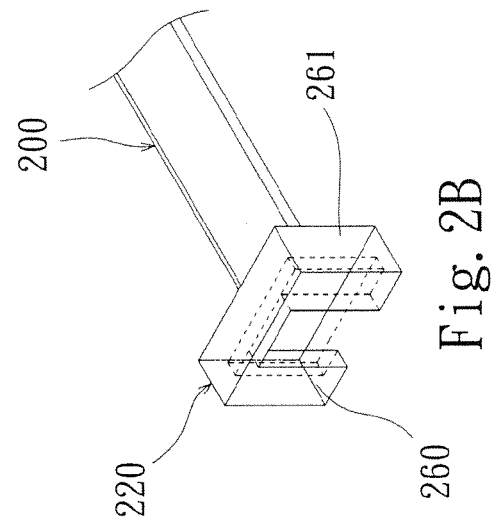
FIG. 2B is a cross-sectional drawing illustrating a light guide with a hooded bracket according to an embodiment of the present invention.

In the embodiment illustrated in FIG. 2B the hooded bracket 220 of the light guide 200 comprises hood grasps 260 that extend from the hood sides 261 to form a slotted front in the hooded bracket 220. When the LED module is inserted into the hooded bracket 220 the hood grasps 260 press against the back of the LED module body and hold the LED module inside the hooded bracket 220. The slot between the hood grasps 260 allow heat to dissipate from the heatsinks on the LED module.

In the embodiment illustrated in FIG. 2C the hood grasp 260 comprises a wall on the front side of the hooded bracket with an opening in one of the hood side. The LED module can be slid into the hooded bracket through the opening in the bottom and the hood side.

Figure 2E:
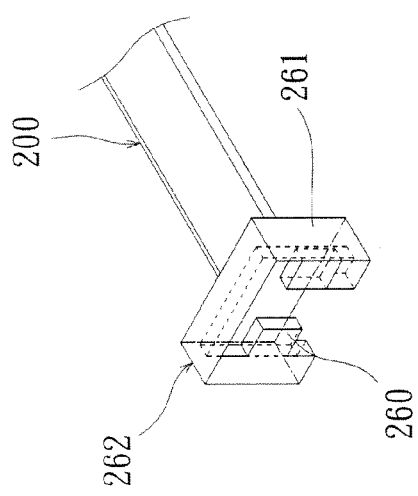
FIG. 2E is an end view drawing illustrating a hooded bracket of a light guide according to an embodiment of the present invention.

In the embodiment illustrated in FIGS. 2D and 2E the hood grasps 260 comprise flexible wings that extend from the hood sides 261. Since the hood grasps 260 are flexible a variety of sizes of LED modules can be utilized. As the LED module is inserted into the hooded bracket 220 the hoods grasps adjust to the size or thickness of the LED module body and apply pressure against the LED module to hold it inside the hooded bracket 220.

Figure 2F:
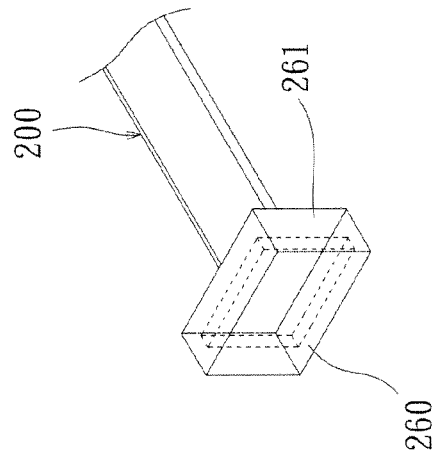
FIG. 2F is a cross-sectional drawing illustrating a light guide with a hooded bracket according to an embodiment of the present invention.
Figure 2G:
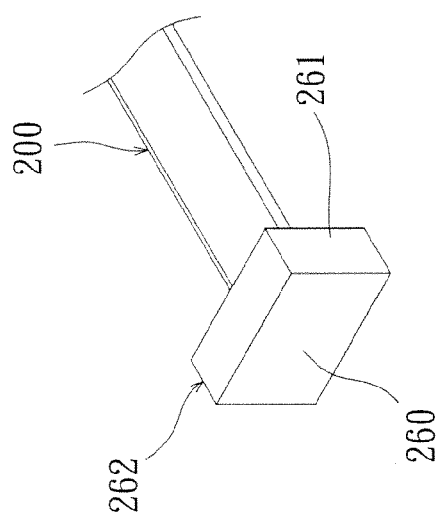
FIG. 2G is an end view drawing illustrating a hooded bracket of a light guide according to an embodiment of the present invention.

In the embodiment illustrated in FIGS. 2F and 2G the hood grasp 260 comprise a hood front spanning the hood sides 261 to form a hooded bracket 220 that is enclosed except for the opening in the bottom of the hooded bracket. This allows the hooded bracket 220 to surround the sides and top of the LED module body to hold it inside the hooded bracket 220 while allowing the conductive pins to extend through the bottom opening in the hooded bracket 220.

Figure 2H:
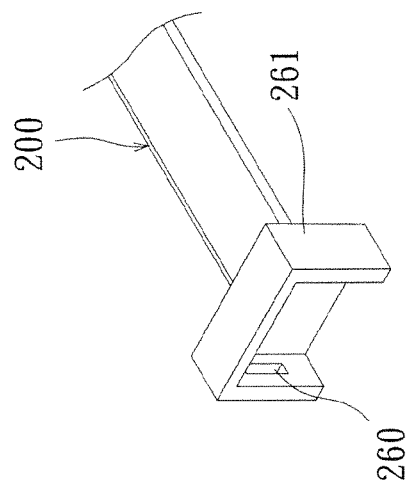
FIG. 2H is a drawing illustrating a hood grasp of a hooded bracket according to an embodiment of the present invention.

In the embodiment illustrated in FIG. 2H the hood grasps 260 comprise indentations in the hood sides 261.

Figure 2I:
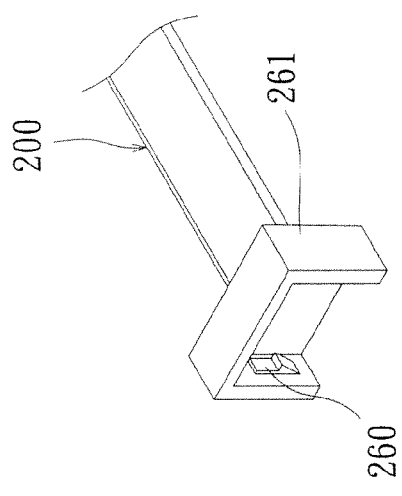
FIG. 2I is a drawing illustrating a hood grasp of a hooded bracket according to an embodiment of the present invention.

In the embodiment illustrated in FIG. 2I the hood grasps 260 comprise ears.

Figure 2J:
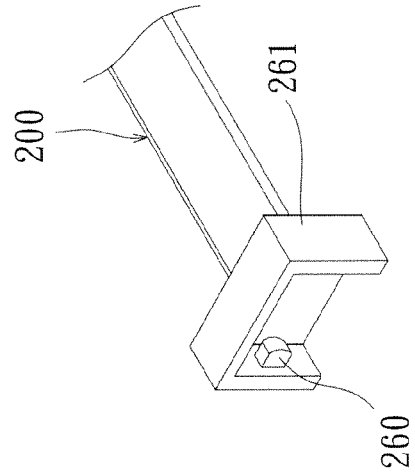
FIG. 2J is a drawing illustrating a hood grasp of a hooded bracket according to an embodiment of the present invention.

In the embodiment illustrated in FIG. 2J the hood grasps 260 comprise posts.

Figure 2K:
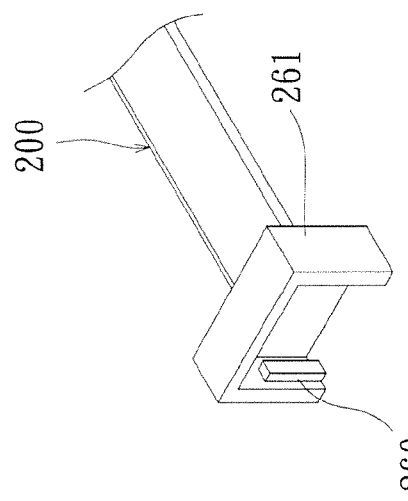
FIG. 2K is a drawing illustrating a hood grasp of a hooded bracket according to an embodiment of the present invention.

In the embodiment illustrated in FIG. 2K the hood grasps 260 comprise slides extending from the interior of the hood sides 261.

Figure 2L:
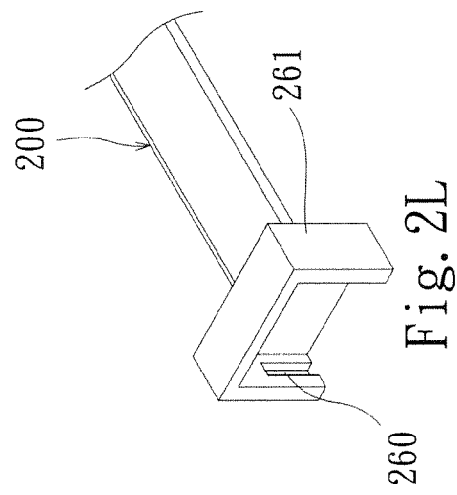
FIG. 2L is a drawing illustrating a hood grasp of a hooded bracket according to an embodiment of the present invention.

In the embodiment illustrated in FIG. 2L the hood grasps 260 comprise grooves extending into the hood sides 261.

In the embodiment illustrated in FIG. 2M the hood grasps 260 comprise flexible tabs formed in the hood sides 261. The flexible tabs can expand outwards when the LED module is inserted and then collapse back to the original position after the LED module is inserted.

In the embodiment illustrated in FIG. 2N the hood grasps 260 comprise holes in the hood sides 261.

It should be noted that the hood grasps of the hooded bracket and the module grasps of the LED module are mating elements and interchangeable. Embodiments detailed describing the hood grasps are also applicable to the module grasps. For example, in an embodiment where the hood grasp is a post and the module grasp is a hole or indentation, in another embodiment the hood grasp is a hole or indentation and the module grasp is a post.

Figure 3A:
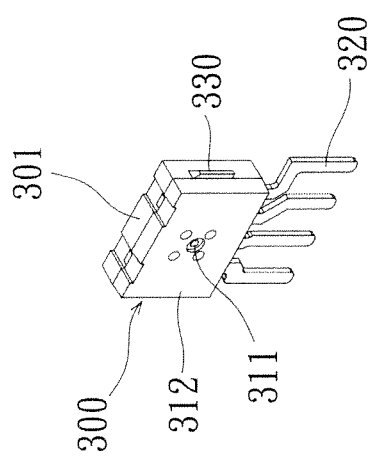
FIG. 3A is a drawing illustrating a light emitting diode module with module grasps according to an embodiment of the present invention.
Figure 3B:
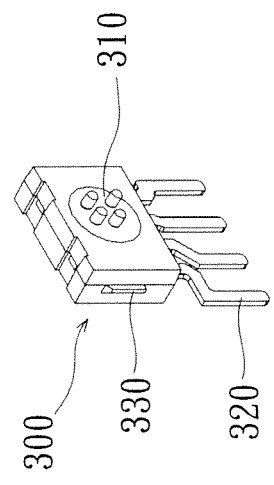
FIG. 3B is a drawing illustrating a light emitting diode module with module grasps according to an embodiment of the present invention.

Refer to FIGS. 3A-3B, which are drawings illustrating a light emitting diode module with module grasps according to an embodiment of the present invention.

The light emitting diode (LED) module 300 comprises a module body comprising a module top 301 and a module back 312. A plurality LEDs 310 is disposed in the front of the module body. A plurality of conductive pins 320 extend below the module body for electrically connecting the plurality of LEDs 310 to conductive traces on a printed circuit board (PCB) in the main housing.

A plurality of heatsinks 311 is disposed in the module back 312 for dissipating heat generated by the LEDs 310.

The LED module 300 further comprises module grasps 330 disposed on sides of the module body. The module grasp 330 comprises grasping elements, for example, a tab, an ear, a hole, a slot, a groove, an indentation, a post, or a slide rail which mate with the hood grasp of the hooded bracket.

Figure 3C:
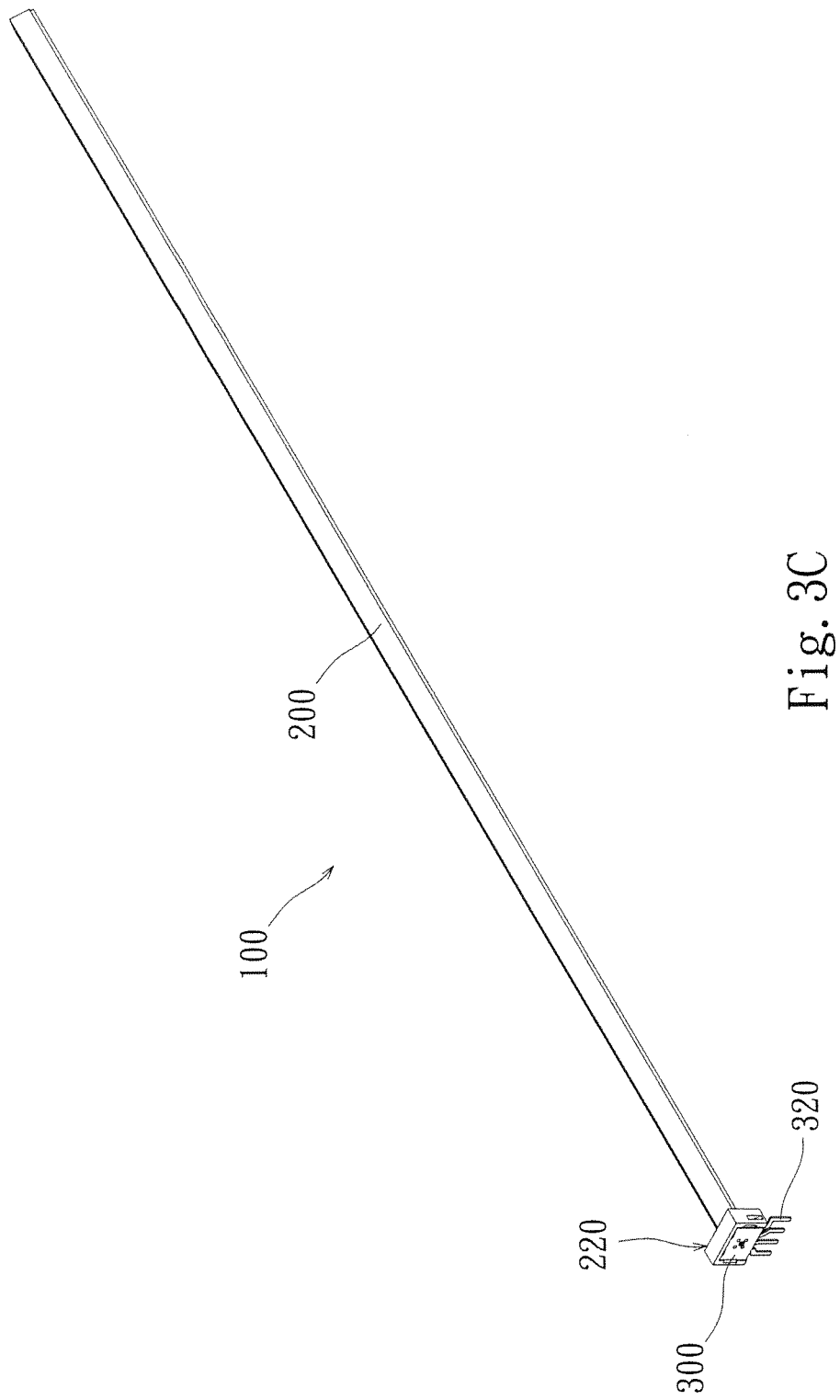
FIG. 3C is a drawing illustrating a coverless linear light source according to an embodiment of the present invention.

Refer to FIG. 1 and FIG. 3C, which are drawings illustrating a light guide and light emitting diode module of a coverless linear light source according to an embodiment of the present invention.

To assemble the coverless linear light source 100 of the present invention the LED module 300 is inserted into the hooded bracket 220 of the light guide 200.

The hood top 262 contacts the module top 301 and the hood sides 261 contact the sides of the module body of the LED module 300. The size of the interior of the hooded bracket 220 is formed to fit and hold the LED module 300 in the bracket 220.

To hold the LED module 300 and the hooded bracket 220 even more securely, the hood grasps 260 mate with the module grasps 330 and attach the LED module 300 and the hooded bracket together.

Since the LED module 300 and the hooded bracket 220 are connected together, the present invention offers a far superior conservation of light emitted by the LED module 300 and entering the light guide 200. Additionally, the hooded bracket 220 maintains the LED module 300 at an optimal angle to the light guide 220 to improve light intensity.

Figure 4B:
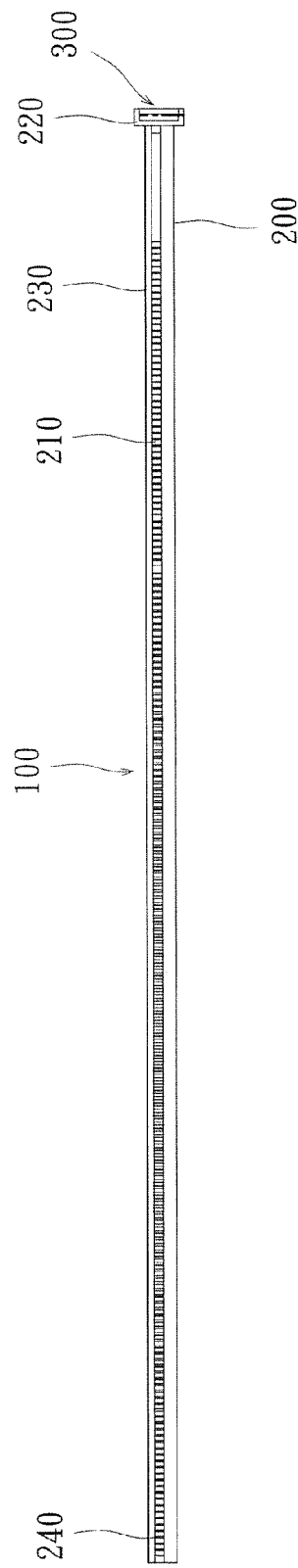
FIG. 4B is a bottom view drawing of a coverless linear light source with a light guide with a light reflecting patterned surface according to an embodiment of the present invention.
Figure 4C:
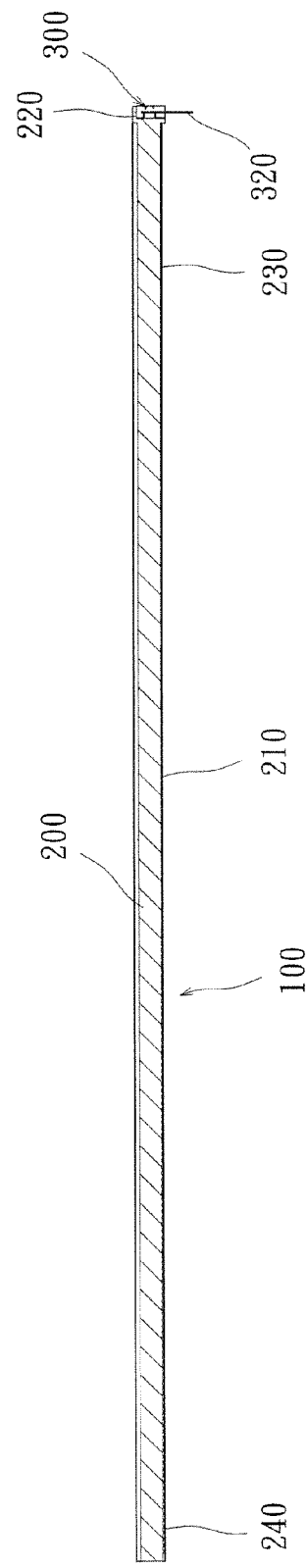
FIG. 4C is a cross-sectional view drawing of a coverless linear light source with a light guide with a light reflecting patterned surface according to an embodiment of the present invention.
Figure 4D:
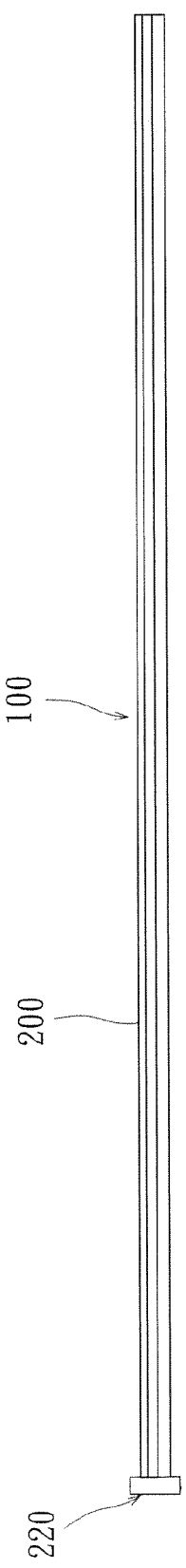
FIG. 4D is a top view drawing of a coverless linear light source according to an embodiment of the present invention.
Figure 4E:
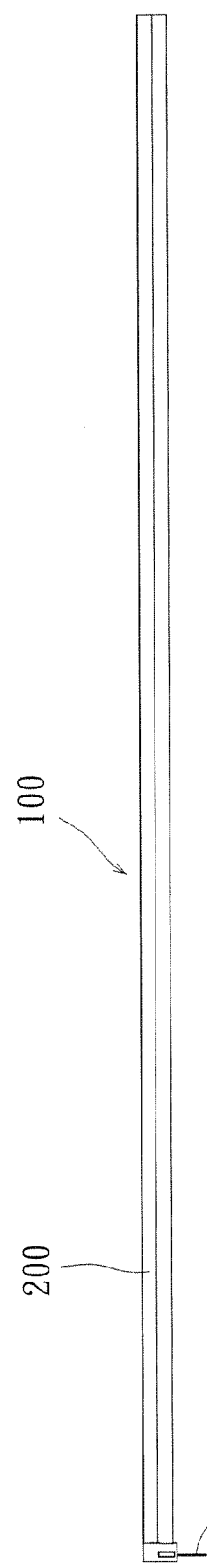
FIG. 4E is a side view drawing of a coverless linear light source according to an embodiment of the present invention.
Figure 4F:
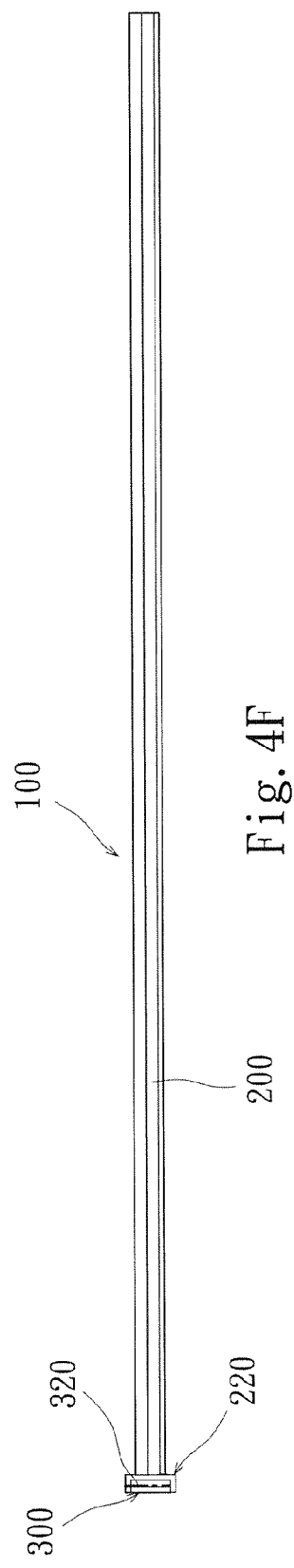
FIG. 4F is a drawing illustrating a coverless linear light source according to an embodiment of the present invention.

Refer to FIG. 4A, which is a drawing illustrating a coverless linear light source according to an embodiment of the present invention.

When the coverless linear light source 100 is assembled the alignment and positioning of the light guide 200 and the LED module 300 are as shown in FIG. 4A. The light receiving end of the light guide 200 is positioned over the LEDs of the LED module 300. When power is applied to the conductive pins 320 the LEDs illuminate and emit light into the light guide 200. The light travels through the light guide 200 and is reflected by the light reflecting patterned surface 210 and exits the light guide 200 through the light emitting surface 216.

Figure 6A:
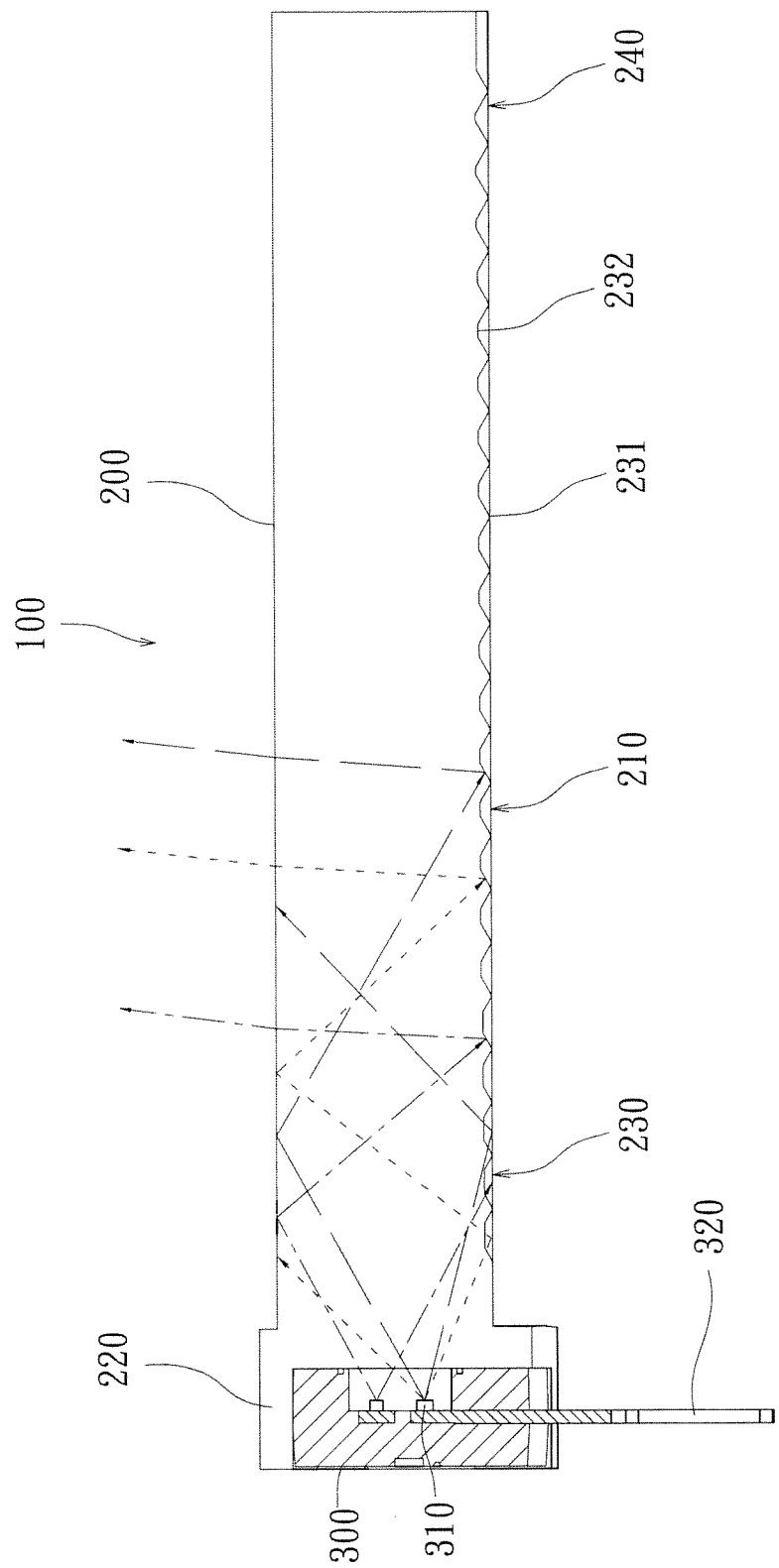
FIG. 6A is a cross-sectional side view drawing illustrating light paths of the light guide with light reflecting patterned surface according to an embodiment of the present invention.

Refer to FIGS. 4B-4F, which are drawings illustrating a coverless linear light source with a light guide with a light reflecting patterned surface according to an embodiment of the present invention, and to FIG. 6A, which is a cross-sectional side view drawing illustrating light paths of the light guide with light reflecting patterned surface according to an embodiment of the present invention.

The light reflecting patterned surface 210 of the light guide 200 comprises a pattern start 230 and a pattern end 240. The pattern start 230 is disposed closest to the hooded bracket 220 and light receiving end of the light guide 200. The pattern end is at the opposite end of the light guide 200 farther away from the light receiving end.

The light reflecting patterned surface 210 comprises a plurality of peaks 231 and a plurality of valleys 232 with a valley 232 disposed between each peak 231.

As the light reflecting patterned surface 210 extends along the light guide 200 the depth of each valley 232 increases. At the pattern start 230, which is closest to the LEDs 310, the depth of the valley 232 is shallowest and the height of the peak 231 from the floor of the valley 232 is the shortest.

As the light reflecting patterned surface 210 continues away from the LEDs 310 the depth of the valley 232 gradually increases and the height of the peak 231 from the floor of the valley 232 continues to gradually increase.

At the pattern end 240, which is farthermost away from the LEDs 310, the depth of the valley 232 is deepest and the height of the peak 231 from the floor of the valley 232 is the tallest.

At the pattern end 240 the floor of the valley 232 is narrowest and the pattern is or approaches a sawtooth pattern where the valley is or close to a v-shape. Moving towards the LEDs the floor of the valley 232 becomes flat and gradually widens. At the pattern start 230 the floor of the valley 232 is widest.

Figure 5A:
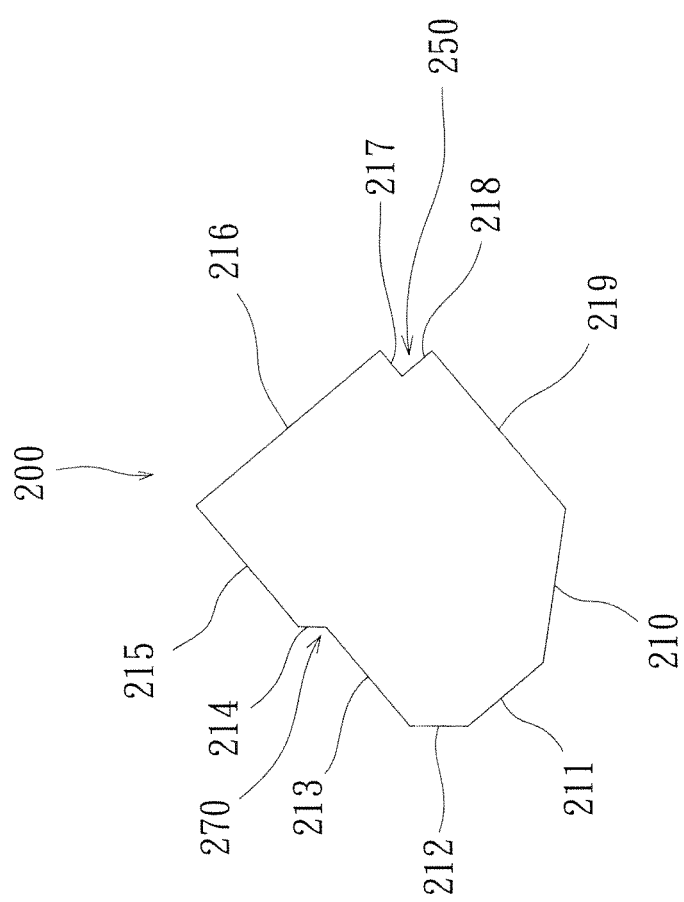
FIG. 5A is a cross-sectional view drawing illustrating a light guide of a coverless linear light source according to an embodiment of the present invention.

Refer to FIG. 5A, which is a cross-sectional view drawing illustrating a light guide of a coverless linear light source according to an embodiment of the present invention.

In the embodiment illustrated in FIG. 5A the light guide 200 comprises a light reflecting patterned surface 210 for reflecting light towards a light emitting surface 216 and the reflected light exits the light guide 200 via the light emitting surface 216.

A side groove 250 comprises a two-sided notch disposed on the right corner of the light emitting surface 216. The side groove 250 comprises a side groove upper surface 217 and a side groove lower surface 218. A side clip of a main housing extends into the side groove 250 and grasps the side groove lower surface 218 to hold the light guide 200 in a main housing. The side groove upper surface 217 contacts the right corner of the light emitting surface 216 and the side groove lower surface 218 contacts a top corner of a right side surface 219.

A top groove 270 comprises a two-sided obtuse angle notch. The top groove 270 comprises a top groove upper surface 214 and a top groove lower surface 213. A top clip of a main housing extends into the top groove 270 and grasps the top groove lower surface 213 to hold the light guide 200 in a main housing. The top groove upper surface 214 contacts a bottom corner of a left side surface 215 and the top groove lower surface 213 contacts a top corner of an angled side surface 212.

A plurality of side surfaces are disposed between the light reflecting patterned surface 210 and the light emitting surface 216.

A right side surface 219 is disposed between the side groove lower surface 218 of the side groove 250 and the light reflecting patterned surface 210. A left side surface 215 is disposed between the light emitting surface 216 and the top groove upper surface 214 of the top groove 270. A bottom side surface 211 is disposed on a left corner of the light reflecting patterned surface 210. An angled side surface 212 is disposed between the bottom side surface 211 and the top groove lower surface 213.

Figure 5B:
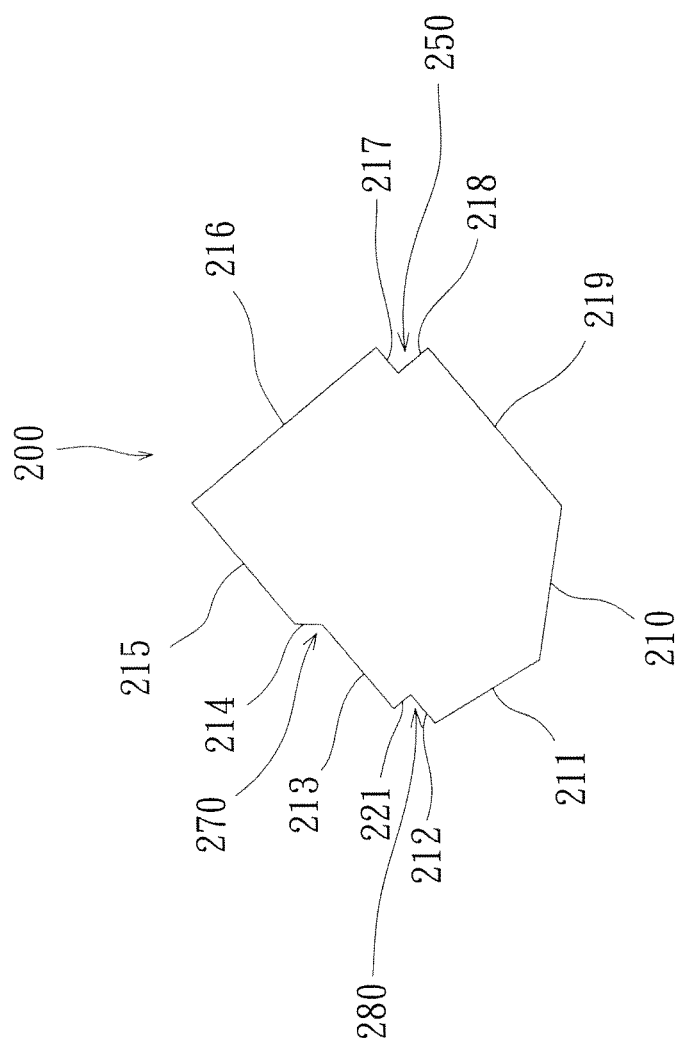
FIG. 5B is a cross-sectional view drawing illustrating a light guide of a coverless linear light source according to an embodiment of the present invention.

Refer to FIG. 5B, which is a cross-sectional view drawing illustrating a light guide of a coverless linear light source according to an embodiment of the present invention.

In the embodiment illustrated in FIG. 5B the light guide 200 comprises a left groove 280 disposed on the light guide 200 where the angled side surface (212 FIG. 5A) was positioned. The left groove 280 comprises a left groove upper surface 221 and a left groove lower surface 212. The left groove upper surface contacts the top groove lower surface 213 of the top groove 270. The left groove lower surface contacts the left corner of the bottom side surface 211.

Figure 6B:
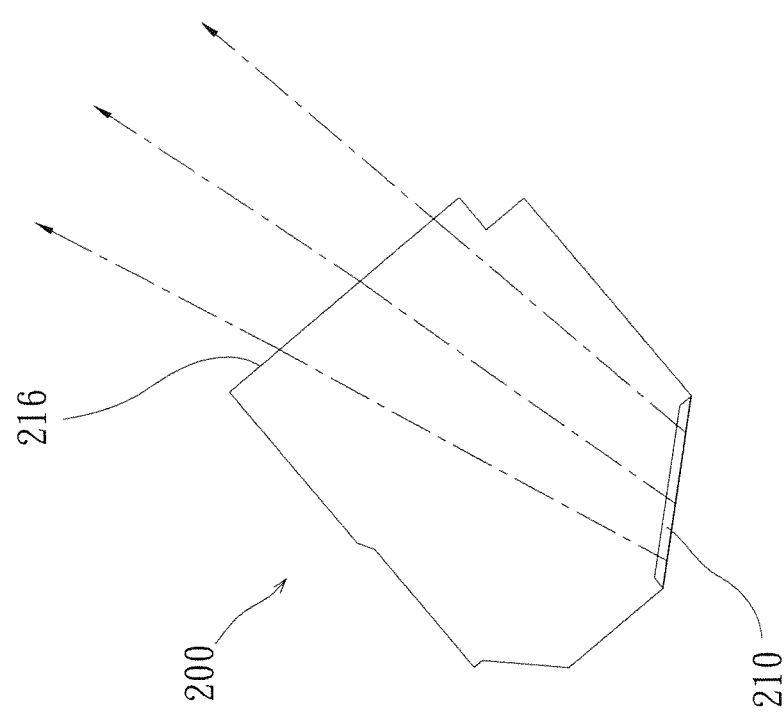
FIG. 6B is a cross-sectional drawing illustrating light paths of the light guide with light reflecting patterned surface according to an embodiment of the present invention.
Figure 6C:
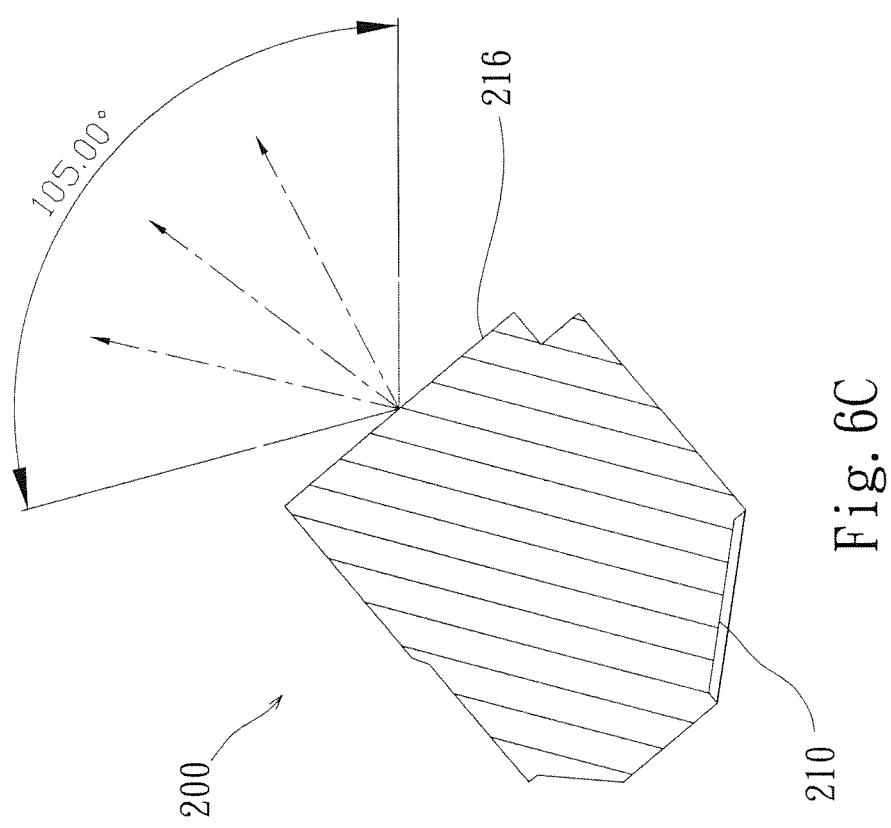
FIG. 6C is a cross-sectional drawing illustrating emitted light paths of the light guide according to an embodiment of the present invention.
Figure 7A:
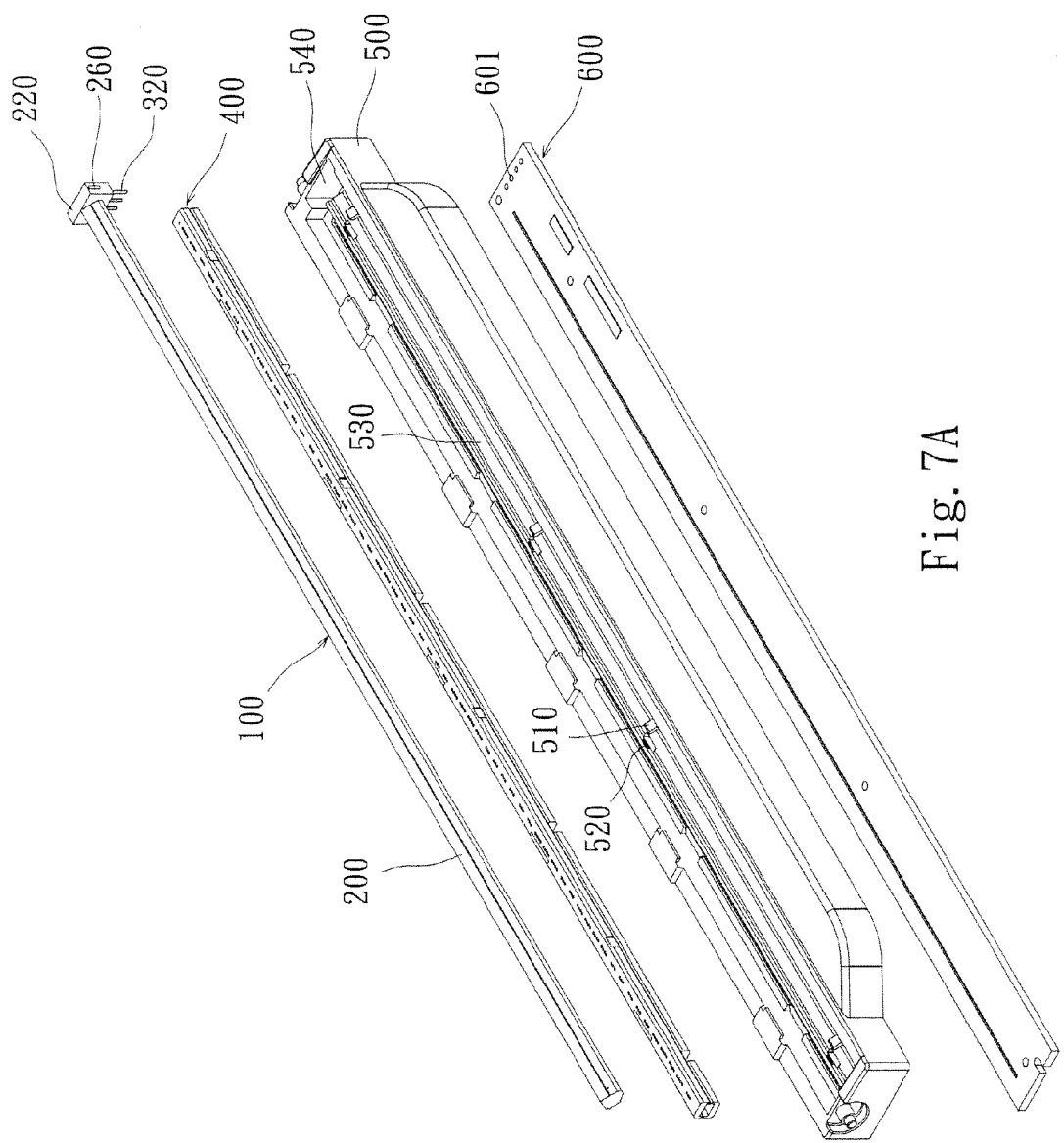
FIG. 7A is a drawing illustrating a coverless linear light source, lens array, main housing, and printed circuit board according to an embodiment of the present invention.
Figure 7B:
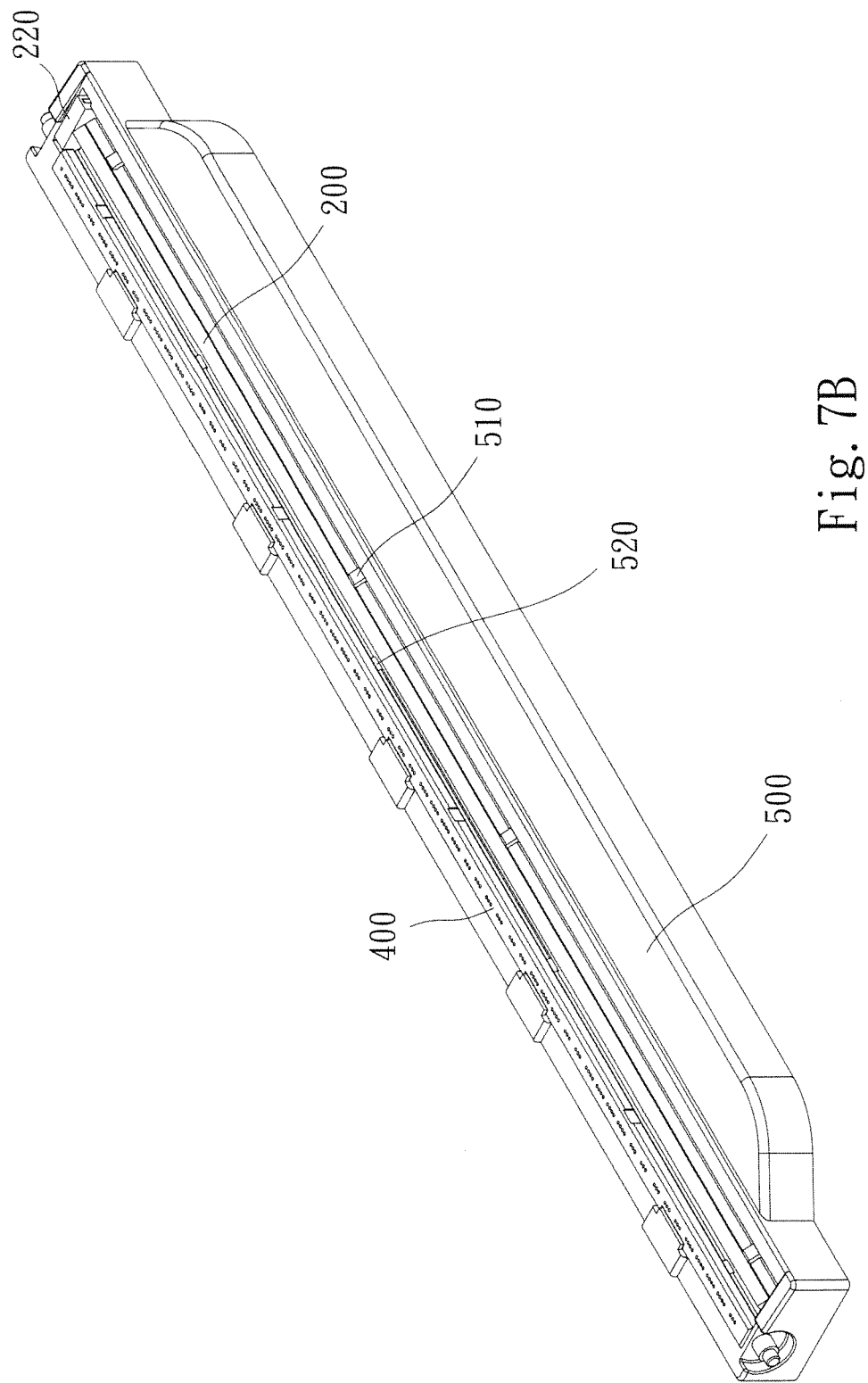
FIG. 7B is a drawing illustrating a coverless linear light source, lens array, and main housing according to an embodiment of the present invention.
Figure 7C:
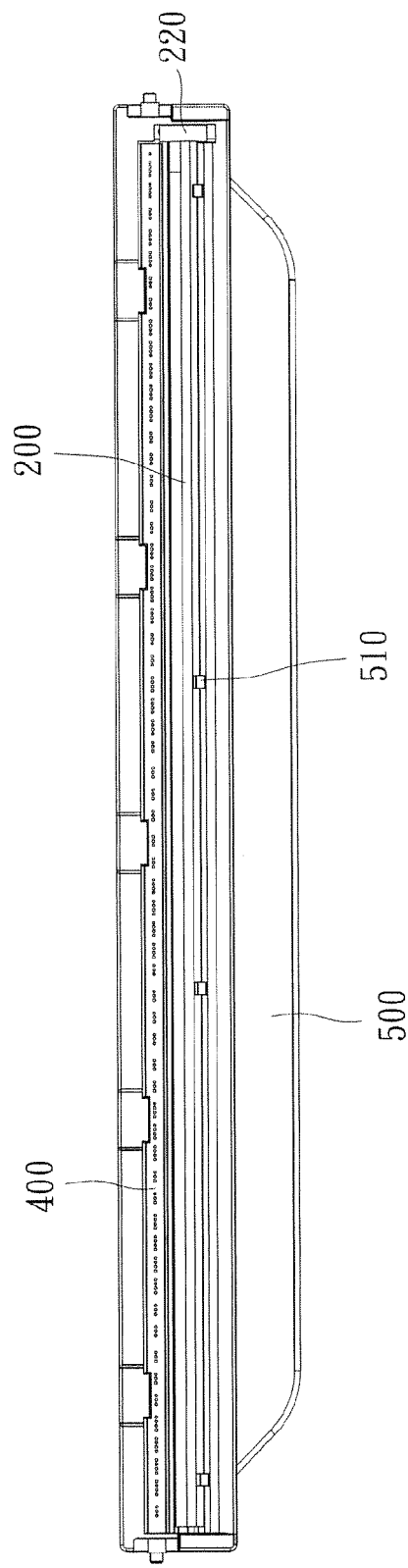
FIG. 7C is a top view drawing illustrating a coverless linear light source, lens array, and main housing according to an embodiment of the present invention.
Figure 7D:
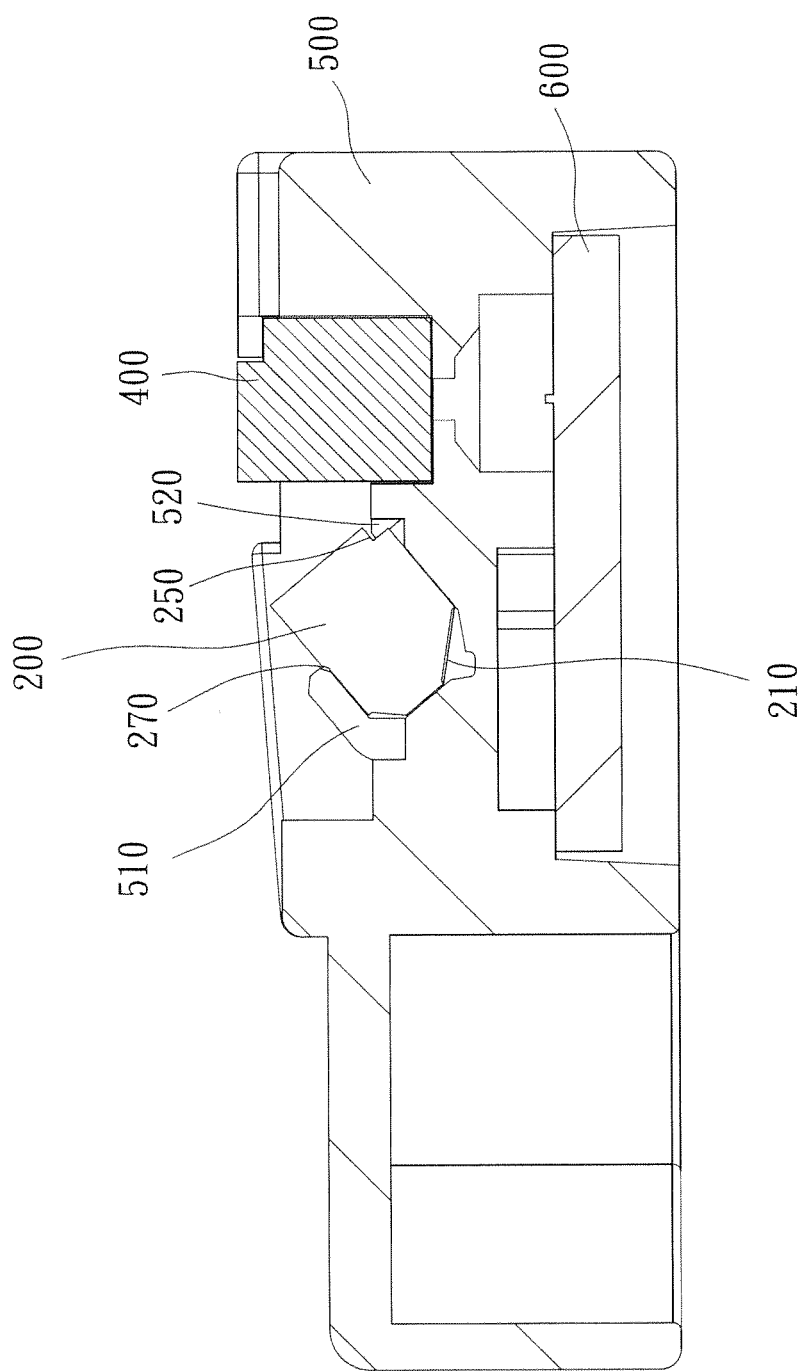
FIG. 7D is a cross-sectional drawing illustrating a coverless linear light source, lens array, printed circuit board, and main housing according to an embodiment of the present invention.

Refer to FIG. 6A and refer to FIG. 6B, which is a cross-sectional drawing illustrating light paths of the light guide with light reflecting patterned surface according to an embodiment of the present invention, and to FIG. 6C, which is a cross-sectional drawing illustrating emitted light paths of the light guide according to an embodiment of the present invention.

When power is applied by the printed circuit board to the conductive pins 320, which are electrically connected to the LEDs 310, the LEDs 310 illuminate and emit light into the light receiving end of the light guide 200. The light travels or propagates through the light guide 200 and is reflected by the light reflecting patterned surface 210 towards the light emitting surface 216 of the light guide 210. Some of the light can be reflected by other sides, for example, the bottom side surface, the right side surface, the left side surface, the angled side surface, the top groove, the side groove, or the left groove prior to being reflected by the light reflecting patterned surface 210.

The light reflected by the light reflecting patterned surface 210 towards the light emitting surface 216 exits the light guide via the light emitting surface 216.

The light paths of the emitted light of the light guide 200 travel in a variety of angles away from the light emitting surface 216. In an embodiment of the present invention as illustrated in FIG. 6C the emitted light shines in a range of, for example, 105 degrees. This field of illumination allows for uniform illumination of the target object to be captured.

Refer to FIG. 7A-7D, which are drawings illustrating a coverless linear light source, lens array, main housing, and printed circuit board according to an embodiment of the present invention.

The sub-module for a scanner comprises main housing 500, a printed circuit board (PCB) 600, a lens array 400, and the coverless linear light source 100.

The PCB 600 comprises circuitry and electronic devices for controlling the electrical components of the sub-module. The lens array 400 focuses light reflected off of the target object and passes the focused light to sensors below the lens array 400 for capturing an image of the target object.

The main housing 500 holds the components of the sub-module together. The main housing 500 comprises a top clip 510, a side clip 520, a light guide cavity 530, and a hooded bracket cavity 540 all disposed on a top surface of the main housing 500. The top clip 510 and the side clip 520 are disposed on opposite sides of the light guide cavity 530. The hooded bracket cavity 540 is disposed on an end of the light guide cavity 530.

To assemble the sub-module for the scanner, the PCB 600 is inserted into the bottom of the main housing 500 and the lens array 400 is inserted into a top area of the main housing 500.

The coverless linear light source 100 is inserted into the light guide cavity 530 and the hooded bracket cavity 540 with the elongated polygonal transparent section of the light guide 200 inserted into the light guide cavity 530 and the hooded bracket 220 of the light guide 200 inserted into the hooded bracket cavity 540.

The conductive pins 320 of the LED module extend through PCB holes 601 in the PCB 600 and are electrically connected to conductive traces on the PCB 600.

When the light guide 200 is inserted into the light guide cavity 530, the side clips 520 of the main housing 500 enter the side groove 250 of the light guide 200 and grasp the side groove lower surface. Also, the top clips 510 of the main housing 500 grasp and apply pressure against the top groove lower surface of the top groove 270. The top clips 510 apply pressure against the top groove lower surface to push the light guide 200 against the side clips 520 and maintain the side clips 520 in the side groove 250. In this way, the coverless linear light source 100 is securely held in the main housing. Additionally, if required, the coverless linear light source 100 can be removed from the main housing 500 by applying pressure against the top clips 510 to release the side clips 520 from the side groove 250.

In operation the PCB 600 provides power to the conductive pins 320 of the LED module which turns on the LEDs. The LEDs emit light into the hood back of the hooded bracket which is the light receiving end of the light guide 200. The light reflects off of the light reflecting patterned surface 210 of the light guide 200 and exits the light emitting surface of the light guide 200. The light illuminates a target object and is reflected to the lens array 400 which focuses the light for sensors to capture an image of the target object.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A linear light source comprising:
   a light emitting diode module;
   a hooded bracket; and
   a light guide comprising:
      a light receiving end for receiving light emitted by the light emitting diode module; the hooded bracket being disposed around the light receiving end, the hooded bracket being provided for securely attaching the light emitting diode module to the light guide;
      a plurality of side surfaces, at one of the side surfaces for being grasped by a main housing to hold the light guide to the main housing; and
      a light emitting surface for emitting light disposed between two of the side surfaces;
   the plurality of side surfaces further comprising:
   a top groove for holding the light guide by a top clip of the main housing;
   a light reflecting patterned surface;
   a bottom side surface; and
   an angled side surface;
   wherein the bottom side surface is disposed between the light reflecting patterned surface and the angled side surface, the angled side surface is disposed between the bottom side surface and the top groove, the light reflecting patterned surface reflects light received through the light receiving end.

2. The linear light source of claim 1, the hooded bracket comprising:
   a hood back, a portion of the hood back comprising the light receiving end of the light guide;
   a hood top; disposed over the hood back; and
   a pair of hood sides disposed on the hood back.

3. The linear light source of claim 2, the hooded bracket further comprising:
   at least one hood grasp disposed on the pair of hood sides, the at least one hood grasp for holding the light emitting diode module to the light guide.

4. The linear light source of claim 3, the at least one hood grasp comprising a tab, an ear, a hole, a slot, a groove, an indentation, a post, a flap, a slide, a flexible tab, a slotted front, a hood front, a walled front with open side, or a flexible wing.

5. The linear light source of claim 3, the at least one hood grasp comprising a grasping element that mates with a grasping element of the light emitting diode module.

6. The linear light source of claim 1, the light reflecting patterned surface comprising:
   a plurality of peaks and a plurality of valleys, the plurality of valleys gradually increasing in depth away from the light receiving end of the light guide.

7. The linear light source of claim 1, the plurality of side surfaces further comprising:
   a side groove for holding the light guide by a side clip of a main housing;
   a right side surface disposed between the side groove and the light reflecting patterned surface, the side groove disposed between the right side surface and the light emitting surface; and
   a left side surface disposed between the top groove and the light emitting surface.

8. A linear light source comprising:
   a light emitting diode module;
   a hooded bracket; and
   a light guide comprising:
      a light receiving end for receiving light emitted by a light emitting diode module; the hooded bracket being disposed around the light receiving end, the hooded bracket being provided for attaching the light emitting diode module to the light guide to maintain optimal alignment and proximity in order to conserve received light intensity and maintain uniformity of emitted light;
      a side groove for holding the light guide by a side clip of a main housing;
      a top groove for holding the light guide by a top clip of the main housing;
      a light emitting surface for emitting reflected light;
      a light reflecting patterned surface disposed on a side of the light guide between the side groove and the top groove for reflecting light towards the light emitting surface; and
      a plurality of side surfaces disposed around the light emitting surface, the plurality of side surfaces comprising:
         a bottom side surface; and
         an angled side surface, the bottom side surface disposed between the light reflecting patterned surface and the angled side surface, the angled side surface disposed between the bottom side surface and the top groove.

9. The linear light source of claim 8, the hooded bracket comprising:
   a hood back, a portion of the hood back comprising the light receiving end of the light guide;
   a hood top; disposed over the hood back; and
   a pair of hood sides disposed on the hood back.

10. The linear light source of claim 9, the hooded bracket further comprising:
    at least one hood grasp disposed on the pair of hood sides for mating with module grasps of the light emitting diode module to hold the light guide and the light emitting diode module together.

11. The linear light source of claim 10, the at least one hood grasp comprising a tab, an ear, a hole, a slot, a groove, an indentation, a post, a flap, a slide, a flexible tab, a slotted front, a hood front, a walled front with open side, or a flexible wing.

12. The linear light source of claim 10, the at least one hood grasp comprising a grasping element that mates with a grasping element of the light emitting diode module.

13. The linear light source of claim 8, the light reflecting patterned surface comprising:
   a plurality of peaks and a plurality of valleys, the plurality of valleys gradually increasing in depth away from the light receiving end of the light guide.

14. The linear light source of claim 8, the plurality of side surfaces further comprising:
   a right side surface disposed between the side groove and the light reflecting patterned surface, the side groove disposed between the right side surface and the light emitting surface; and
   a left side surface disposed between the top groove and the light emitting surface.

15. The linear light source of claim 8, further comprising:
   a printed circuit board for providing electrical power to the linear light source;
   the light emitting diode module comprising:
      a plurality of light emitting diodes;
      a plurality of module grasps for holding the light emitting diode module to the light guide; and
      a plurality of conductive pins for electrically coupling the plurality of light emitting diodes to the printed circuit board;
   a main housing comprising:
      the top clip;
      the side clip; and
      a light guide cavity, the light guide seated in the light guide cavity and the top clip and the side clip cooperating to hold the light guide in the light guide cavity;
      wherein the printed circuit board is attached to a bottom surface of the main housing.

16. A linear light source comprising:
   a light emitting diode module;
   a hooded bracket; and
   a light guide comprising:
      a light receiving end for receiving light emitted by the light emitting diode module; the hooded bracket being disposed on the light receiving end of the light guide for holding the light emitting diode module to the light guide; the hooded bracket comprising:
         a hood back, a portion of the hood back comprising the light receiving end of the light guide;
         a hood top; disposed over the hood back; and
         a pair of hood sides disposed on the hood back;
      a side groove for holding the light guide by a side clip of a main housing;
      a top groove for holding the light guide by a top clip of the main housing;
      a light emitting surface for emitting reflected light;
      a light reflecting patterned surface disposed on a side of the light guide between the side groove and the top groove for reflecting light towards the light emitting surface, the light reflecting patterned surface eliminating need of a reflective cover around the light guide, the light reflecting patterned surface comprising a plurality of peaks and a plurality of valleys, the plurality of valleys gradually increasing in depth away from the light receiving end of the light guide;
      a right side surface disposed between the side groove and the light reflecting patterned surface, the side groove disposed between the right side surface and the light emitting surface;
      a bottom side surface;
      an angled side surface, the bottom side surface disposed between the light reflecting patterned surface and the angled side surface, the angled side surface disposed between the bottom side surface and the top groove; and
      a left side surface disposed between the top groove and the light emitting surface.

17. The linear light source of claim 16, the hooded bracket further comprising:
   at least one hood grasp disposed on the pair of hood sides for mating with module grasps of the light emitting diode module to hold the light guide and the light emitting diode module together.

18. The linear light source of claim 17, the at least one hood grasp comprising a tab, an ear, a hole, a slot, a groove, an indentation, a post, a flap, a slide, a flexible tab, a slotted front, a hood front, a walled front with open side, or a flexible wing.

* * * * *